United States Patent

Lundberg et al.

[11] Patent Number: 5,822,686
[45] Date of Patent: Oct. 13, 1998

[54] CHANNEL SCANNING SCHEME FOR SIGNAL STRENGTH MEASUREMENT SYSTEMS AND METHODS

[75] Inventors: Jan-Erik Lundberg, Sollentuna; Fredrik Gustafson, Stockholm, both of Sweden

[73] Assignee: Telefonaktiebolaget LM Ericsson, Stockholm, Sweden

[21] Appl. No.: 570,687

[22] Filed: Dec. 11, 1995

[51] Int. Cl.[6] .................................................. H04B 1/18
[52] U.S. Cl. .................................. 455/161.3; 455/161.1; 455/166.1
[58] Field of Search .............................. 455/33.2, 161.3, 455/166.1, 54.1, 56.1, 186.1, 186.2, 161.2, 165.1, 167, 62, 161.1

[56] References Cited

U.S. PATENT DOCUMENTS

| | | | |
|---|---|---|---|
| 4,622,695 | 11/1986 | Whiting | 455/58.2 |
| 4,833,728 | 5/1989 | Kimura et al. | 455/186.1 |
| 5,150,362 | 9/1992 | Akerberg | 370/95.1 |
| 5,163,161 | 11/1992 | Bowles et al. | 455/164.1 |
| 5,170,490 | 12/1992 | Cannon et al. | 455/72 |
| 5,408,696 | 4/1995 | Hofverberg | 455/226.2 |
| 5,457,816 | 10/1995 | Koyama | 455/161.3 |
| 5,551,071 | 8/1996 | Nakano et al. | 455/186.1 |

FOREIGN PATENT DOCUMENTS

| | | |
|---|---|---|
| 441372 | 8/1991 | European Pat. Off. . |
| 486089 | 5/1992 | European Pat. Off. . |
| WO87/05181 | 8/1987 | WIPO . |
| WO92/19982 | 11/1992 | WIPO . |

OTHER PUBLICATIONS

European Standard Search Report No. RS 96248 Date of Completion of Search: 11 Jul. 1996.
Robert Sedgewick, *Algorithms* (Second Edition), p. 163—chapter 12 end (1988).

Primary Examiner—Amelia Au
Attorney, Agent, or Firm—Burns, Doane, Swecker & Mathis, L.L.P.

[57] ABSTRACT

Methods and systems for measuring signal strengths of radio signals in radiocommunication systems are described. In many radiocommunication systems, base stations and/or mobile station take signal strength measurements on various radio channels, e.g., those in neighboring calls, to provide information to the system for channel allocation and handoff decisions. By sorting lists of channels to be measured into frequency order and taking into account a last tuned channel as well as radio specific tuning characteristics, the overall time spent tuning to each channel in the list can be reduced.

36 Claims, 6 Drawing Sheets

| SYSTEM | BANDWIDTH (MHZ) | NUMBER OF CHANNELS | BOUNDARY CHANNEL NUMBER | TRANSMITTER CENTER FREQUENCY (MHZ) | |
|---|---|---|---|---|---|
| | | | | MOBILE | BASE |
| (NOT USED) | | 1 | (990) | (824.010) | (869.010) |
| A" | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| A' | 1.5 | 50 | 667 | 845.010 | 890.010 |
| | | | 716 | 846.480 | 891.480 |
| B' | 2.5 | 83 | 717 | 846.510 | 891.510 |
| | | | 799 | 848.970 | 893.970 |

Fig. 3(b) PRIOR ART

| TRANSMITTER | CHANNEL NUMBER | CENTER FREQUENCY (MHZ) |
|---|---|---|
| MOBILE | $1 \leq N \leq 799$ | $0.030\, N + 825.000$ |
| | $990 \leq N \leq 1023$ | $0.030\, (N-1023) + 825.000$ |
| BASE | $1 \leq N \leq 799$ | $0.030\, N + 870.000$ |
| | $990 \leq N \leq 1023$ | $0.030\, (N-1023) + 870.000$ |

CHANNEL SCANNING SCHEME FOR SIGNAL STRENGTH MEASUREMENT SYSTEMS AND METHODS

BACKGROUND

The present invention is directed generally to radiocommunication systems and, more particularly, to techniques for measuring signal strengths of received radio signals in such systems.

In radiocommunication systems it is desirable that a mobile station with an established connection on a radio channel should be able to maintain the established connection when moving from one cell served by one base station to another cell served by another base station. The process by which a mobile station maintains an established connection when moving between cells in a cellular radio system is generally referred to as an intercell handoff. It is also highly desirous that a mobile station with an established connection on a radio channel be able to maintain the connection when moving within the same cell, even if the radio channel being used is subject to increased interference. Sometimes intracell interference can be alleviated by changing to a new channel within the cell, which process is also usually referred to as an intracell handoff.

In general, radiocommunication is only possible when the desired information-carrying radio signals have sufficient signal strength at the receiver and are sufficiently strong in relation to noise and interfering radio signals at the receiver. The minimum signal strength of course depends on the particular features of the system, e.g., the kind of modulation and receiver used. In order to determine if an established connection should continue on a selected radio channel between a mobile station and a base station, handoff and disconnect processes perform various measurements on radio signals at the base and/or mobile stations, for example measurements of the Supervisory Audio Tone (SAT), on analog channels, and measurement of the Digital Color Code (DCC) on digital channels. Moreover, the base station also takes measurements on other channels, for example those associated with neighboring base stations, for a variety of reasons, including determining which channels are optimal handoff candidates in the event that a connection degrades in quality. The techniques by which these latter types of measurements are performed are the subject of this application.

The first cellular mobile radio systems in public use were analog systems used to convey speech or other analog information. These systems comprised multiple radio channels for transmitting analog information between base and mobile stations by transmitting analog-modulated radio signals. For the purposes of technical background information, a conventional analog base station will now be described with reference to FIGS. 1(a) and 1(b).

Figure 1A:
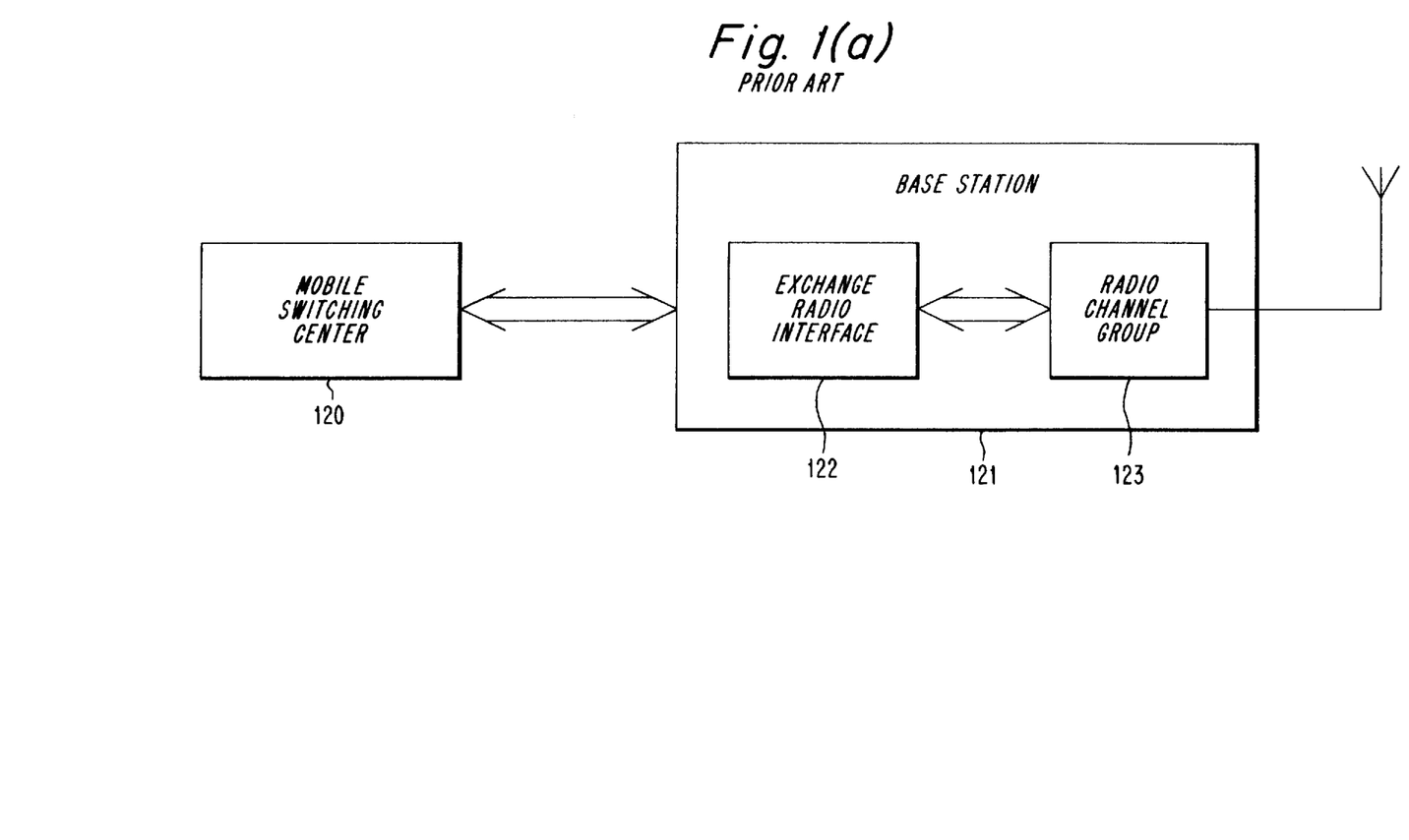
FIG. 1(a) is a block diagram generally illustrating portions of an exemplary analog radiocommunication system in which the present invention can be implemented.

The functional block diagram in FIG. 1(a) shows a mobile switching center 120 connected with at least one base station 121, for example by way of a PCM link. Of course, it will be recognized by those skilled in the art that more than one base station is typically connected to the mobile switching center 120. In general, the base station 121 includes a radio switch interface 122 and a radio channel group 123. The base station 121 relays data and speech signals to the mobile stations and supervises the quality of radio transmissions using the supervisory audio tone (SAT) and by measuring the strength of signals received from the mobile stations.

The radio switch interface 122 functions as a medium to signal between the mobile switching center 120 and the base station 121. The radio switch interface 122 receives data from channel units in the radio channel group 123 and sends this data to the mobile switching center 120 on a dedicated MSC-BS data link. In the opposite direction, the radio switch interface 122 receives data from the mobile switching center 120 on the MSC-BS data link and sends this data to the appropriate channel units in the radio channel group 123. The radio switch interface 122 also receives and digitizes speech from the radio channel group 123 and sends it to the mobile switching center 120 over Pulse Code Modulation (PCM) channels and vice-versa.

Figure 1B:
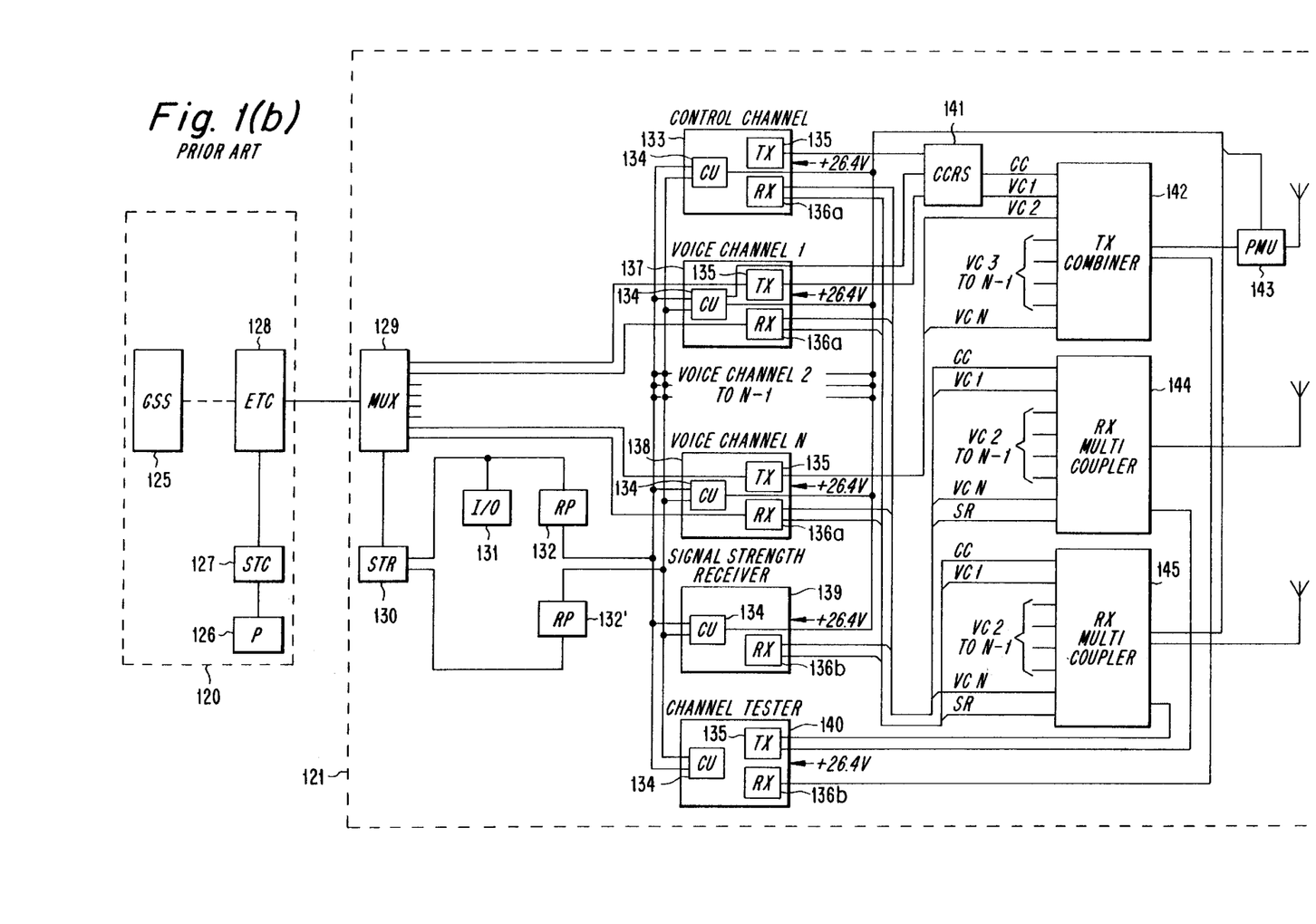
FIG. 1(b) is a block diagram providing more details of the system portions shown in FIG. 1(a)

The mobile switching center 120 and the base station 121 will now be described in more detail in conjunction with FIG. 1(b). The mobile switching center 120 includes a group switch subsystem 125 which connects voice communications from the public switching telephone network (PSTN) to the cellular network. A processor 126 generates the control messages necessary to coordinate the communication from the mobile switching center 120 to the base station 121. A control message from the mobile switching center 120 to a specific control unit 134 in the base station 121 is transmitted from the processor 126 to a central signalling terminal 127. The control message contains an address of a corresponding regional processor 132 which coordinates communication signals with individual control units 134. This address, as well as the contents of the message, are processed by the central signalling terminal 127 and sent to the exchange terminal circuit 128. The exchange terminal circuit 128 inserts the received information into a PCM signal format and transmits the pulse coded information over a PCM link to the multiplexor 129. A regional signalling terminal 130 receives the control message from the multiplexor 129 and ensures that it has not been corrupted during transmission using conventional error checking techniques. The regional signalling terminal 130 then transmits the control message to a regional processor 132. It should be noted that for fault tolerance purposes, a backup regional processor 132' has been shown in a redundant loop. Messages which may be originated by personnel at the base station 121 are connected with the mobile switching center 120 via an input/output interface 131. The regional processor 132 transforms parallel message data into a serial data stream and vice-versa. Individual control units 134, which may be, for example, conventional microprocessors, recognize their own address to retrieve the associated control message.

In addition to control messages communicated between the mobile switching center 120 and the base station 121, voice signals are communicated between the mobile switching center 120 and the base station 121 using a bi-directional voice transmission between one of multiple voice channels VC1 . . . VCN in the base station 121 and the group selection switch 125. The exchange terminal circuit 128 and the multiplexor 129 ensure that the data stream is directed to the appropriate channel during transmission and retrieved from the appropriate channel during reception. Voice signals received by a receiver 136a uplink from a mobile station are sent in analog form to the multiplexor 129 which converts the voice signals into digital form. The digitized voice data are transmitted over the appropriate pulse code modulation (PCM) channel (otherwise referred to as the associated time slot) to the mobile switching center 120, received by the exchange terminal circuit 128, and directed to the group switch 125.

In the downlink direction to the mobile station, the multiplexor 129 receives the digital speech data from the group switch 125 via the exchange terminal circuit 128 on the corresponding PCM channel. The data are converted to analog form and are directed to a dedicated transmitter 135 for radio frequency transmission over a particular voice channel. The channel units are assigned to operate as voice channel units 137 and 138, as a control channel unit 133, as a signal strength receiver 139, or as a channel tester 140.

A voice channel is selected and seized by the mobile switching center 120 during a call access procedure. When the conversation is finished, that channel is free for another conversation. Voice channel assignment is administered by the mobile switching center 120 which maintains a list of all the channels and their states (free, busy, blocked, etc.). When a voice channel becomes free, the transmitter 135 of that channel unit is switched off. When a voice channel is seized, the transmitter 135 is activated.

Because there is normally only one control channel in each cell, a base station serving an omni-directional cell is equipped with one control channel unit 133. The control unit 134 of the control channel unit 133 supervises control messages between the mobile switching center 120 and the base station 121 as well as control-based radio signals between the base station 121 and the mobile stations, such as paging and access signals. The signal strength receiver 139 measures the strength of the signals received from mobile stations on any voice or control channel allocated to the associated cell as well as channels associated with base or mobile stations in neighboring cells. Of course those skilled in the art will appreciate that noise will also typically contribute to the amount of energy measured within any particular bandwidth. Voice channels are continuously scanned in sequence and samples of signal strength measurements are stored in the signal strength receiver control unit 134. These signal strength measurements are transmitted to the mobile switching center 120 when determining whether a call in progress is to be handed off to another cell. The channel tester 140 allows an operator to test the base station equipment.

The conventional processes for measuring signal strengths of various radio channel frequencies are very straightforward. A system processor, for example disposed in a base station controller (not shown) or in the MSC 120, defines a table that includes all of the channel numbers associated with frequencies that are to be measured. The table is provided to the signal strength receiver control unit 134 with the channels in a scanning order from lowest channel number to highest channel number. The signal strength receiver 139 then measures on each channel in the order provided, going from lowest to highest channel number and then jumping back to the lowest channel number again to repeatedly measure the channels in the table until a new table is sent from the regional processor.

This conventional technique, however, is highly inefficient in terms of the overall time taken to measure the table of channels. Consider that the signal strength measurement device must first be tuned to each new frequency associated with the next channel number in the table. Generally, the greater the separation between the frequency to which the signal strength receiver is currently tuned and the next frequency on which signals are to be measured, the longer it takes to retune the receiver. Thus, for example, a large frequency jump between the highest channel number and the lowest channel number made in the conventional channel scanning scheme may take, relatively speaking, a very long time. Moreover, the conventional channel scanning schemes do not take into account a current frequency to which the receiver portion of a signal strength measurement device is tuned when implementing channel scanning. Thus, if a signal strength receiver was previously tuned to a high frequency and subsequently received a new table that began with a lowest channel number associated with a low frequency, then the signal strength receiver would take a long time to initially retune to that low frequency.

Another drawback to these conventional techniques is that, in some systems, the channel numbering scheme is out of order with respect to the frequencies associated with each channel number. For example, higher numbered channels may be associated with lower frequencies than lower numbered channels. This can lead to additional time delays when scanning channels according to the aforedescribed conventional techniques.

Yet another drawback of conventional receivers and scanning techniques is their lack of recognition that different receivers may have different radio characteristics that effect channel scanning times. For example, some receivers may be able to tune to new frequencies more rapidly when moving from a lower frequency to a higher frequency or vice versa.

Recently, digital cellular mobile radio systems for public use have been designed. Digital cellular mobile radio systems provide digital radio channels for transmitting digital or digitized analog information between base and mobile stations using digitally modulated radio signals. Digital cellular mobile radio systems may offer substantial advantages, e.g. greater system capacity per unit bandwidth, over analog cellular mobile radio systems. To achieve these advantages there are certain demands. In particular, channel supervision, handoff and disconnect processes need to be performed rapidly and allowed to be frequently carried out relative to conventional analog systems. Thus, the need for quickly performing channel measurements is even more acute in digital systems and the disadvantages associated with conventional channel scanning schemes even more apparent.

SUMMARY

These and other drawbacks and limitations of conventional methods and systems for measuring, for example, the signal strengths of various radio channel frequencies in radiocommunication systems are overcome according to the present invention. According to exemplary embodiments of the present invention, channel lists received for performing signal strength measurements are first sorted to minimize channel scanning time for the lists. For example, the channel numbers can be sorted in order of their associated frequencies, e.g., from lowest frequency to highest frequency or highest frequency to lowest frequency. To determine the sorting order a current frequency to which the signal strength measurement device is tuned is considered. If, for example, the signal strength measurement device is tuned to a frequency which is lower than a lowest frequency associated with a channel number in the list, then the list is usually sorted from lowest to highest frequency.

If, on the other hand, the signal strength measurement device is currently tuned to a frequency that is higher than a highest frequency associated with a channel number in the list, then the list is usually sorted from highest frequency to lowest frequency. If the signal strength measurement device is currently tuned to a frequency that is somewhere within the range of frequencies in the list, then the list is sorted in the order which is determined to optimize the channel scanning time.

In addition to frequency sorting and taking into consideration a current frequency at which a signal strength measurement device is currently tuned, exemplary embodiments of the present invention recognize that each radio device may differ in certain characteristics that have an impact on how long it takes to tune a receiver from one frequency to another. For example, it may be faster to tune a receiver in a forward frequency direction than in a reverse frequency direction. Accordingly, the decision to sort and scan the channels in a particular frequency order can also be made taking into account the particular radio characteristics of the device which is to make the measurements. In fact, depending upon the type of receiver characteristics involved, the scanning order may not follow a sequential frequency order.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

While the foregoing description of conventional techniques for measuring signal strengths of various radio channels was predicated on an analog base station, those skilled in the art will readily appreciate that the inventive techniques disclosed herein are equally applicable to digital base stations. Since the differences between analog and digital base stations are not germane to a discussion of signal strength measurement, they are not further explored herein. However, the interested reader is directed to, for example, the U.S. Standard for Dual Mode Radiocommunication Systems embodied in the publication EIA/TIA-IS-54, which document is incorporated here by reference. Since an exemplary analog base station has already been described, the following exemplary embodiments will be described in the context of a digital base station, i.e., a base station which transmits information using digitally modulated radio signals.

Figure 2A:
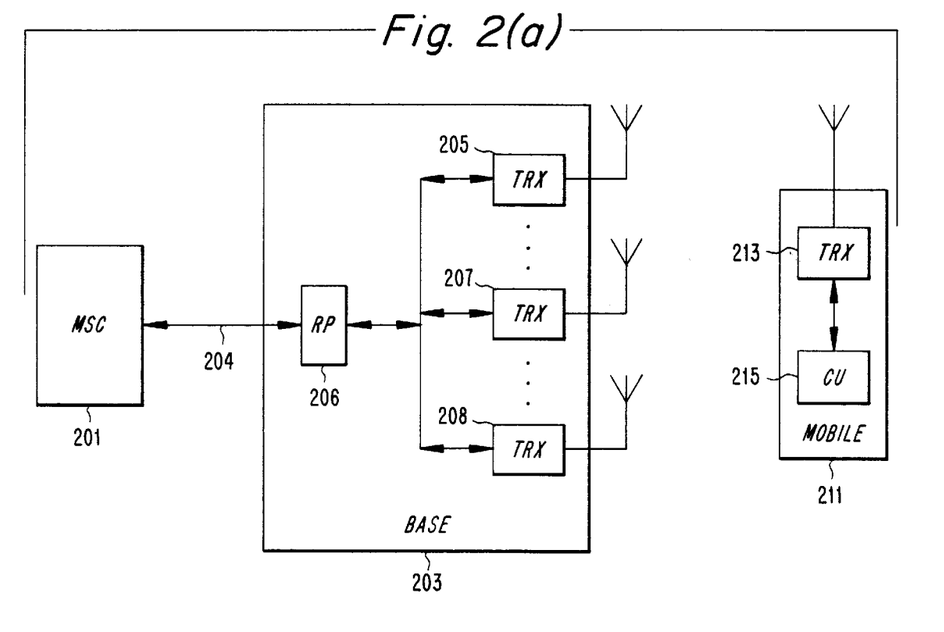
FIG. 2(a) is a block diagram generally illustrating portions of an exemplary digital radiocommunication system in which the present application can be implemented.

FIG. 2(a) is a block diagram illustrating such a digital base station. Therein, many of the functional units are similar to those discussed above with respect to the exemplary analog base station. A mobile switching center 201 is connected to base station 203 by way of a plurality of PCM links, generally denoted by reference numeral 204. The base station typically includes many transceiver units (TRX) only three of which have been illustrated for simplicity of the diagram, those being numbered 205, 207 and 208. A regional processor 206 is used to interface between the mobile switching center 201 and base station 203. One or more of the transceiver units of base station 203 may transmit over the air interface to a mobile station 211. As is well known in the art, mobile station 211 can include, for example, a transceiver 213, control unit 215 and other circuitry used to communicate with base station 203 over the air interface.

Figure 2B:
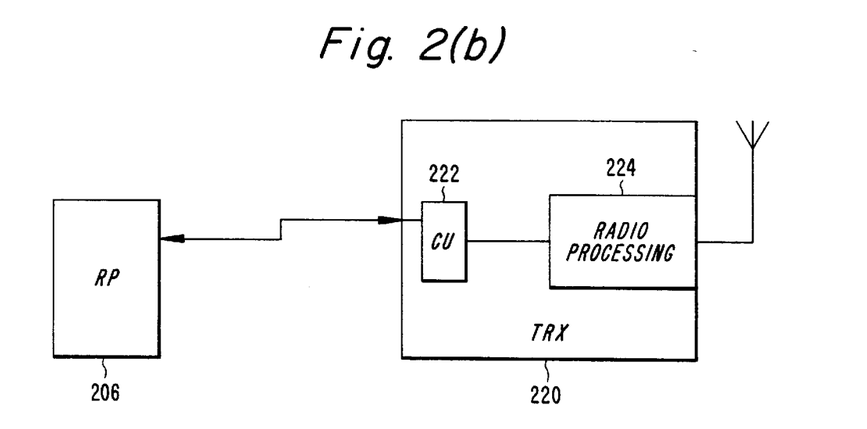
FIG. 2(b) is a block diagram providing more details of the exemplary system portions of FIG. 2(a)

FIG. 2(b) focusses on one of the system transceiver units which is used for signal strength measurement. The transceiver, identified by reference numeral 220, is dedicated to measuring signal strengths of various radio channels as instructed by regional processor 206. For example, regional processor 206 may instruct control unit 222 of transceiver 220 to measure a list of channels, for example, those of neighboring base stations. As will be appreciated by those skilled in the art, cellular radiocommunication systems are laid out based upon each base station's capability for providing radio signal coverage to a predetermined geographical area, referred to commonly as a "cell". Adjacent base stations provide coverage for adjacent cells. Since, as described above, a mobile unit may move from the geographical region covered by a first base station to that covered by a second base station, thereby necessitating a handoff, the system needs to have up-to-date information regarding which other base stations' channels are optimal for such a handoff. Another reason for measuring signal strengths of radio channels is to gather information used in a channel allocation algorithm, which determines the initial traffic channel allocated to a previously idle mobile unit that has requested access to the system. In any event, the control unit 222 then tunes the radio processing part 224 to each of the frequencies associated with the channel numbers provided in the list from the regional processor and takes signal strength measurements on each of those frequencies.

Figure 3A:
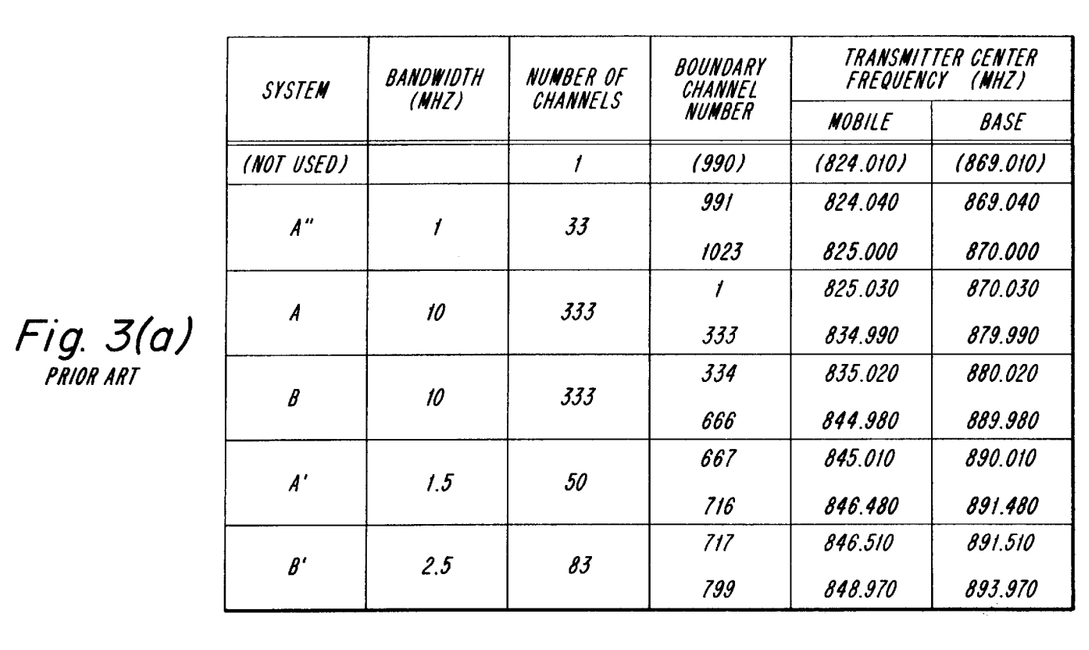
FIGS. 3(a) and 3(b) are tables illustrating channel numbering and corresponding frequency assignments in the dual-mode U.S. radiocommunication standard IS-54.
Figure 3B:
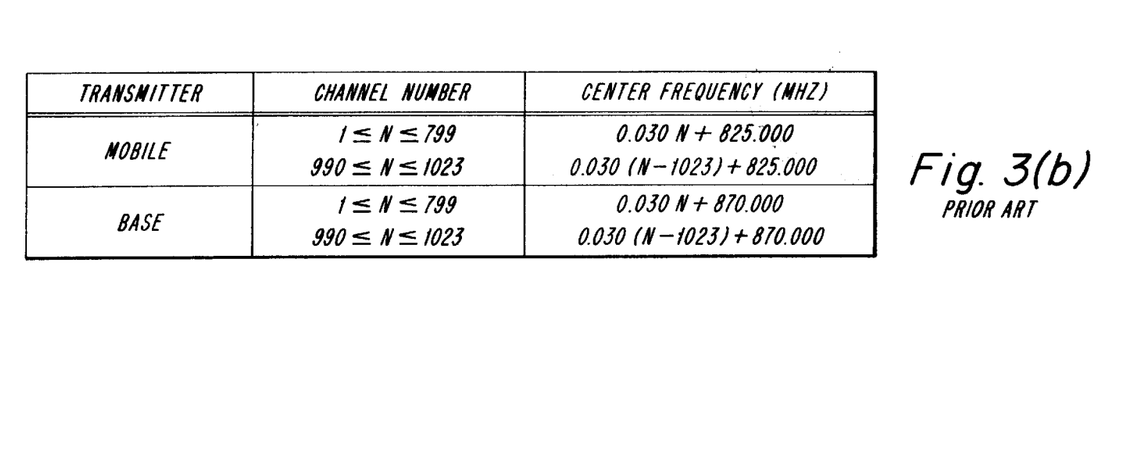

In order to fully understand channel scanning schemes according to the present invention, it is important to recognize the relationship between channel numbers and channel frequencies. This discussion will be facilitated by reviewing the table set forth in FIGS. 3(a) and 3(b), wherein the channel numbers and corresponding channel frequencies for radio channels defined by the above incorporated IS-54 standard are illustrated. Therein, note that the channel numbers, set forth in the fourth column from the left hand side of the table in FIG. 3(a) are not sequentially ordered in correspondence with the carrier frequencies associated therewith. Specifically, note that channel numbers 991 through 1023 have lower frequencies than those associated with channel numbers 1 through 799. This is of particular interest because, according to exemplary embodiments of the present invention, the channel numbers received in the list from regional processor 206 should be sorted based upon the frequency order of the channels rather than their channel number. As will be described below, this enables systems according to the present invention to minimize the overall time taken to lock on to each of the frequencies which are associated with the channel numbers identified in the list of radio channels to be measured. FIG. 3(b) illustrates how the center carrier frequency of a channel according to the IS-54 specification can be calculated based upon its channel number N.

Figure 4:
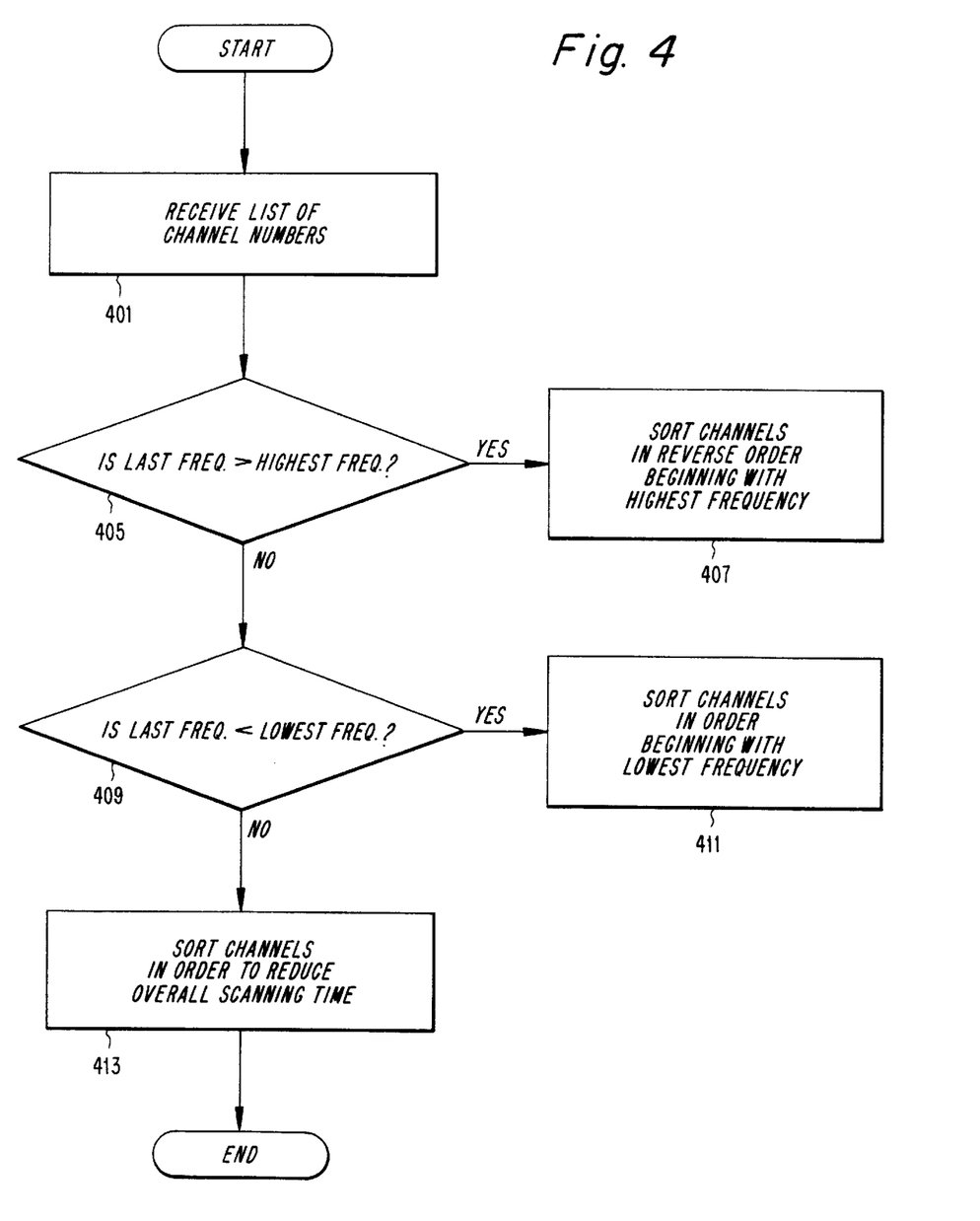
FIG. 4 is a flowchart illustrating a technique for sorting channels to be measured according to an exemplary embodiment of the present invention.

Given an understanding of the distinction between channel numbers and channel frequencies, a description of an exemplary channel sorting and scanning scheme will now be provided with respect to the flowchart of FIG. 4. In this first exemplary embodiment, suppose that the radio device characteristics have been evaluated but do not effect the channel scanning time for this particular receiver. For example, the time that it takes to tune the receiver from any channel n to the next highest channel n+1 is the same as that which it takes to tune from channel n+1 and channel n.

Consider then that the control unit 222 receives a list of channel numbers from the regional processor 206 at step 401. In this exemplary embodiment, suppose that the list received from regional processor 206 has not yet been sorted. However, those skilled in the art will appreciate that the present invention can be implemented by sorting the list at any stage in the process, i.e., in the processor which first generates the list, any subsequent processor to which the list is transmitted, and, as described here, in the transceiver which actually performs the signal strength measurements. In this example then, control unit 222 receives the list and the flow proceeds to decision block 405 where it is determined whether or not the last frequency to which radio processing part 224 has been tuned is higher than the highest frequency in the list.

If so, then control unit 222 sorts the channel numbers from highest to lowest frequency and instructs the signal strength measuring device to scan the listed channels in their reverse frequency order beginning with the highest frequency in the sorted list. Thus, for the case identified in block 407, the radio processing device would begin with the highest frequency in the list and sort through the list until it reaches the lowest frequency in the list. In this way, the scanning order is optimized to begin closest to the last frequency to which the radio processing device has been tuned. This in turn minimizes the initial time needed to lock on to the first frequency in the list. As will be appreciated from the foregoing description of channel numbers and their associated channel frequencies, the order of channel numbers may not be the same as a list which is ordered by frequency. This difference will be highlighted below in several numerical examples.

If, on the other hand, the test of decision block 405 results in a negative decision, then the flow follows the "no" branch to block 409 where it is then determined if the last frequency to which radio processing part 224 was tuned is lower than the lowest frequency in the list. If so, then the flow moves to block 411 wherein the control unit 222 sorts the channel numbers based on increasing frequency and instructs the radio processing part to scan the channels in frequency order beginning with the lowest frequency in the sorted list. This also has the effect of reducing the overall time taken to scan the channels in the list since it provides the smallest frequency jump between the last frequency to which the radio processing unit has been tuned and the first radio channel frequency on which signal strength measurements are to be made.

If the last frequency that was measured is within the range of frequencies found in the list of channel numbers, then the flow moves to block 413 wherein the channels are sorted and then scanned in the order which minimizes the time that it takes to tune to the first channel in the list. For example, if the last frequency is closer to the lowest frequency in the list, then the list can be sorted and scanned in frequency order. Alternatively, if the last frequency is closer to the highest frequency in the list, then the list can be sorted and scanned in reverse frequency order.

Having described an overall exemplary technique for sorting received channel number lists according to a first exemplary embodiment of the present invention, several numerical examples will now be provided to reinforce this description. Suppose, first of all, that the radio transceiver 220 has just been initialized and that radio processing part 224 has been tuned to a default channel, e.g., channel 1. Suppose then that control unit 222 receives the following list of channels from the regional processor 206, set forth in the row entitled "Received List".

| Received List | 100 | 500 | 200 | 600 | 700 | 799 | 300 | 400 | 50 | 150 |
|---|---|---|---|---|---|---|---|---|---|---|
| Sorted List | 50 | 100 | 150 | 200 | 300 | 400 | 500 | 600 | 700 | 799 |

According to the exemplary technique described in the flowchart of FIG. 4, these channel numbers would be sorted in their increasing channel number order (as shown above in the row entitled "Sorted List") because the default frequency is lower than that associated with channel number 50, i.e., the flow would proceed to block 411.

Next, suppose that a new list (RL) is received from regional processor 206 asking control unit 222 to perform signal strength measurements on the list set forth below.

| RL | 10 | 20 | 30 | 40 | 50 | 60 | 70 | 80 | 90 | 100 |
|---|---|---|---|---|---|---|---|---|---|---|
| SL | 100 | 90 | 80 | 70 | 60 | 50 | 40 | 30 | 20 | 10 |

Since the last channel tuned to in the first example was channel number 799 and because channel number 799 has a higher frequency than channel number 100, the channel numbers will be sorted in falling order as seen above in row SL (sorted list).

As a third example, assume that the following list (RL) of channels numbers is received by control unit 222.

| RL | 100 | 10 | 20 | 90 | 80 | 30 | 40 | 70 | 60 | 50 |
|---|---|---|---|---|---|---|---|---|---|---|
| SL | 10 | 20 | 30 | 40 | 50 | 60 | 70 | 80 | 90 | 100 |

Then, the sorted list (SL) of channel numbers will be as shown above according to the process of FIG. 4 since the last channel tuned to was channel number 10, i.e., which is the same as the lowest channel number (and frequency) in the received list.

A fourth measurement order is received by control unit 222 which subsequently requests that signal strength measurements be performed on the following list (RL) of channels.

| RL | 1000 | 1010 | 1020 | 10 | 20 | 30 | 40 | 50 | 60 | 70 |
|---|---|---|---|---|---|---|---|---|---|---|
| SL | 70 | 60 | 50 | 40 | 30 | 20 | 10 | 1020 | 1010 | 1000 |

Since the last channel to which the signal strength measurement device was tuned in the previous example was channel number 100, i.e., a channel number whose associated frequency is higher than the highest frequency in the received list, then the channels will be sorted in reverse frequency order as set forth in block 407 and seen above. Note that in this example, channel numbers 1020, 1010 and 1000 are found at the end of the list because, as seen in FIG. 3(*a*), their associated frequency is lower than that of channel numbers 70, 60, 50, 40, 30, 20 and 10.

As a last example, suppose that the following list was next received by control unit 222.

| RL | 995 | 1000 | 997 | 998 | 999 | 996 | 1001 | 1002 | 1003 | 1004 |
|----|-----|------|-----|-----|-----|------|------|------|------|------|
| SL | 995 | 996  | 997 | 998 | 999 | 1000 | 1001 | 1002 | 1003 | 1004 |

Since the last channel tuned to was 1000, i.e., within the range of channel frequencies which have been received, then the flow falls to block 413 where the channels are sorted in an order which would reduce the overall tuning time, e.g., from lowest to highest frequency in the example given above. Of course, those skilled in the art will recognize that one could also have sorted these frequencies in reverse order to achieve substantially the same overall time of channel measurement where, as in this exemplary case, the radio device characteristics do not favor one scanning direction over the other.

Another factor which can be considered in determining the scanning order of frequencies to be measured for a particular transceiver 220 is the impact of radio device characteristics associated with the receiver or transceiver performing the measurements since these characteristics may effect the amount of time it takes to change from one particular frequency to another particular frequency. For example, Applicants discovered during their design process, that the particular radio device under test exhibited different behavior between tuning in a forward frequency direction and tuning in a reverse frequency direction. Specifically, it was found that it was faster to tune from channel n to channel n+1 than it was to tune from channel n+1 and channel n. Thus, for this particular radio, sorting and scanning the channels from lowest frequency to highest frequency may be favorable even in circumstances wherein the exemplary technique described in FIG. 4 would indicate that the channels should be scanned in reverse frequency order. A numerical example will serve to illustrate this point.

Suppose, for example, that radio processing part 224 is currently tuned to channel number 100. Also consider that control unit 222 receives a list of channel numbers 90 through 99 on which it is instructed to perform signal strength measurements. For case 1, the radio processing part 224 has the radio device characteristics described in the table below.

| CASE 1 | |
|--------|---|
| Channel Change | Tuning Time |
| 100 to 90 | 3 ms |
| n to n + 1 | 1 ms |
| n + 1 to n | 1.1 ms |

These characteristics can be measured at the time of manufacturing and stored in a memory device (not shown) associated with control unit 222. Considering these exemplary radio device characteristics, control unit 222 can evaluate in which order channel numbers 90–99 should be sorted and scanned to achieve the lowest overall channel scanning time. For example, control unit 222 can evaluate the amount of time that it will take to perform the frequency jumps needed to measure the signal strengths on this list of channels if the channels are sorted in forward frequency order. The total time would include the 3 millisecond (ms) jump from channel number 100 to channel number 90 plus nine jumps of 1 ms each, for a total frequency jumping time of 12 ms. Control unit 222 can also evaluate the time that it would take to perform the necessary jumps if the channels were sorted and scanned in their reverse frequency order. To perform the operation thusly would take ten jumps of 1.1 ms each for a total of 11 ms. Since the overall time is lower if the channels are sorted in their reverse frequency order, control unit 222 would select the reverse order as opposed to the forward frequency order for sorting and scanning.

However, one skilled in the art can readily imagine that a radio processing part 224 having slightly different radio device characteristics would arrive at a different result. This is illustrated by considering the radio device characteristics set forth below as case 2.

| CASE 2 | |
|--------|---|
| Channel Change | Tuning Time |
| 100 to 90 | 3 ms |
| n to n + 1 | 1 ms |
| n + 1 to n | 1.3 ms |

In this example, control unit 222 would once again determine that the tuning time would be 12 ms if the channels are sorted and scanned in their forward frequency direction. On the other hand, since the time that it takes to tune the radio processing part in the reverse direction is somewhat longer for each frequency jump (i.e., 1.3 ms as opposed to 1.1 ms), the overall time taken if sorted in the reverse frequency order now becomes 13 ms. Accordingly, under the exemplary radio device characteristics described for case 2, control unit 222 would instead sort the channels in forward frequency order to reduce the overall channel scanning time.

The previous example illustrates one type of radio device characteristic (e.g., different behavior between tuning in a forward frequency direction and tuning in a reverse frequency direction) which may affect the amount of time that it takes to perform a scanning operation on a received list of channel numbers. However, those skilled in the art will appreciate that many different parameters may impact the amount of time that it takes to tune between different frequencies. Thus, the phrase "radio device characteristic" is intended to generically refer to all such parameters which affect the amount of time that it takes to change (e.g., tune a local oscillator) from one particular frequency to another particular frequency. For example, operating temperature and age of the radio device can impact the tuning time. In fact, more complex radio device characteristics can be envisioned wherein the time needed to tune between adjacent channels in the forward and reverse direction cannot be generalized for all adjacent channels n and n+1 as was done in the prior examples.

For example, consider a system wherein tuning is performed using two separate components. Specifically, a coarse tuner, to rapidly reach the vicinity of the wanted channel frequency, and a fine tuner, to tune more precisely to the correct channel frequency. Assume that the coarse tuner is much faster in obtaining a frequency lock than the fine tuner, whereby it may be more favorable in terms of overall channel scanning time to use the fine tuner as little as possible. For example, assume that the coarse tuner is used to perform frequency jumps that are multiples of 10 frequencies away, while the fine tuner is used for single frequency jumps, e.g., to jump 13 frequencies, a control device would use the coarse tuner to jump 10 frequencies and then the fine tuner to jump 3 frequencies. If the coarse tuner is much faster than the fine tuner, it may be more favorable to perform jumps according to the channel order: 11, 21, 31, 32, 22, 12, 13, 23, 33, than it would be to perform the jumps in the order: 11, 12, 13, 21, 22, 23, 31, 32 and 33 to minimize usage of the fine tuner.

Since it is anticipated that the radio device characteristics will be different for different radio processing parts 224, the radio device characteristics should be provided to the processor which is performing the sorting. For example, if regional processor 206 is performing the sorting, then it would first receive the radio device characteristics of radio processing unit 224 from control unit 222 upon initialization. If this information is to be used in the sorting function, then it is desirable to perform the sorting as close to the radio processing part 224 as possible to minimize the overhead associated with transmitting the radio device characteristics.

Figure 5:
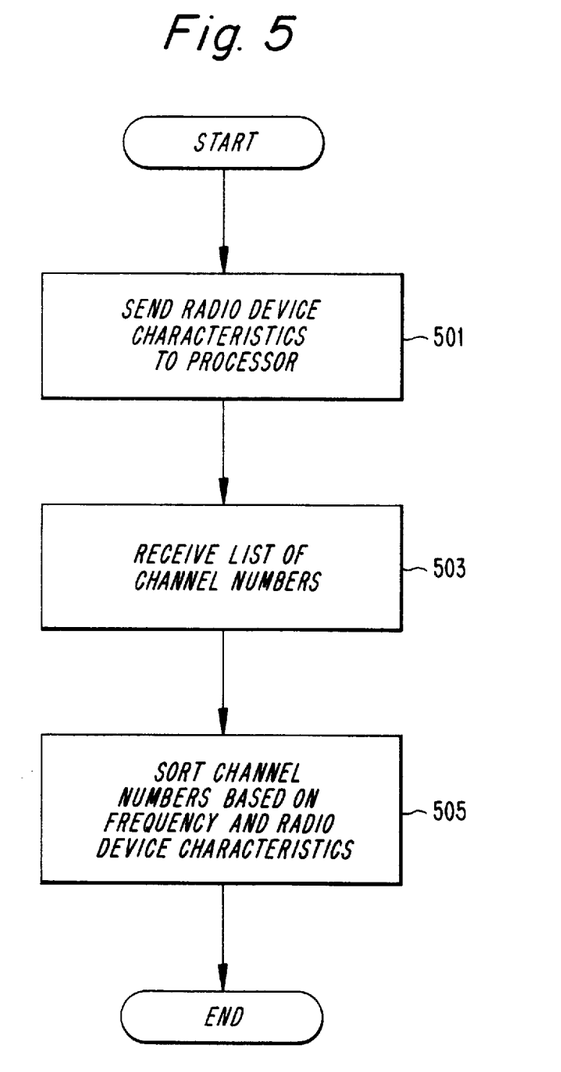
FIG. 5 is a flowchart illustrating a technique for sorting channels to be measured according to another exemplary embodiment of the present invention.

The process associated with this second exemplary embodiment, i.e., where the radio device characteristics can impact the sorting order decision, is diagrammed in the flowchart of FIG. 5. Therein, at block 501, the optional step of transmitting the radio device characteristics to the processor performing the sorting is illustrated. If, on the other hand, sorting is performed as close to the radio processing part as possible, e.g., at control unit 222 instead of regional processor 206 or other processors, then this step would not be necessary. Next, a list of channel numbers is received at block 503, for example from regional processor 206 or (in the case of a mobile station) in a list provided over the air interface. Then, these channel numbers are sorted based upon the radio device characteristics of the transceiver which is performing the signal strength measurements at block 505, e.g., by evaluating the time it would take to perform the frequency jumps needed to tune the receiver in the reverse and forward frequency orders. As described above, however, depending upon the types of radio device characteristics which are involved, the sorted list may or may not be in a sequential frequency order.

While the foregoing examples have described channel lists which are received and sorted ten channels at a time, those skilled in the art will appreciate that many variations and modifications of this format are well within the scope of the present invention. For example, the number of channels in each list may vary. Moreover, if desired, the control unit 222 can wait for additional measurement orders to be received before performing the sorting described above and actually instructing radio processing unit 224 to perform the signal strength measurements. For example, the control unit could wait for 2, 3 or 10 groups of ten channels to be received from regional processor 206. Control unit 222 can include statistical control functions which optimize the tradeoff between the delay in waiting for additional lists to be received versus the benefit in reducing the overall switching time which may be gained by waiting for the additional lists.

For example, suppose that the sorting processor monitors a number of the most recent measurement orders. If the measurement orders frequently include the same, for example, 10 channels, then there is no advantage provided by waiting for additional orders to be received. On the other hand, if the channel numbers in recent measurement orders are spaced apart in an overlapping manner, then it would be desirable to wait for additional measurement orders. For example, suppose that a first measurement order instructs the transceiver 220 to measure on channels 100, 200 and 300. Then suppose that the next measurement order lists channels 130, 230 and 330. The third measurement order lists channels 160, 260 and 360. It will be apparent, based upon the previous discussion, that the sum of the tuning times for each of these three lists measured separately will be greater than the tuning time for these channels sorted together as a single list according to the techniques of the present invention. Accordingly, the sorting function may, upon evaluating these recent measurement orders, come to the conclusion that it would be advantageous to wait for a number of measurement orders before sorting is performed in order to reduce the overall measurement time.

As another example, the sorting processor may perform sorting after each measurement order and after plural measurement orders. Then, the sorting processor can compare the results and select the fastest method. For example, if the sorting function finds that waiting for 5 measurement orders results in an overall reduction in channel scanning time when compared with sorting and scanning each list as it is received, then the sorting processor may decide to implement this technique for subsequently received channel lists. Moreover, the sorting processor can reevaluate this decision on a regular basis, e.g., every minute.

Analogously, it may be advantageous to use statistical functions to determine how often a received channel list, or a group of received lists, should be evaluated by the sorting processor to determine the best sorting order. Although the amount of time used to evaluate each list or group of lists in the manner described above is relatively small (e.g., less than 1 ms), it may be possible to further reduce overall channel scanning time by only periodically evaluating received lists and, between evaluations, assuming that the previously determined sorting order should be followed for subsequently received lists or groups of lists.

While the foregoing discussion has focussed on a decision as to what type of sorting order should be implemented prior to instructing the radio processor parts to actually scan the channels, some sorting mechanism is needed for implementing the sorting. The particular selection of a sorting algorithm is not critical to the present invention although it is of course highly desirable to select a sorting method which is relatively fast. One exemplary sorting method is termed the "Mergesort" technique and is described in Chapter 12 of the book entitled "Algorithm" authored by Robert Sedgewick and published in 1988, the disclosure of which is expressly incorporated here by reference.

Also as described above, the sorting need not be performed in radio transceiver 220. The sorting could, in fact, be performed in regional processor 206. If, however, there are radio characteristics which are unique to transceiver 220 which impact the sorting order that should be adopted, then those radio characteristics should be communicated to regional processor 206 so that they can be accounted for when the sorting is performed at the regional processor.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What we claim is:

1. A method for measuring a received signal strength on each of a plurality of radio channels comprising the steps of:

receiving at least one instruction to measure said received signal strength on each of said plurality of radio channels, said plurality of radio channels being listed in a first order in said instruction;

sorting said plurality of radio channels into a second order; and measuring said received signal strength on each of said plurality of radio channels using said second order, wherein said second order is determined based upon at least one radio device characteristic associated with a radio device which is making said measurements.

2. The method of claim 1, wherein said step of sorting further comprises the step of:

sorting said plurality of radio channels into said second order, said second order being in frequency order from a lowest frequency radio channel among said plurality of radio channels to a highest frequency radio channel among said plurality of radio channels.

3. The method of claim 2, wherein said step of measuring comprises the steps of:

determining if a last radio channel measured prior to receipt of said at least one instruction has a frequency that is lower than said lowest frequency; and if so, measuring said received signal strength on each of said plurality of radio channels beginning with said lowest frequency radio channel and continuing in said second order through said highest frequency radio channel.

4. The method of claim 2, wherein said step of measuring comprises the steps of:

determining if a last radio channel measured prior to receipt of said at least one instruction has a frequency that is higher than said highest frequency radio channel; and if so, measuring said received signal strength on each of said plurality of radio channels beginning with said highest frequency radio channel and continuing in a reverse of said second order through said lowest frequency radio channel.

5. The method of claim 2, wherein said step of measuring comprises the steps of:

determining if a last radio channel measured prior to receipt of said at least one instruction has a frequency that is between said lowest frequency radio channel and said highest frequency radio channel; and if so, measuring said received signal strength on each of said plurality of radio channels beginning with said highest frequency radio channel and continuing in a reverse of said second order through said lowest frequency radio channel.

6. The method of claim 2, wherein said step of measuring comprises the steps of:

determining if a last radio channel measured prior to receipt of said at least one instruction has a frequency that is between said lowest frequency radio channel and said highest frequency radio channel; and if so, measuring said received signal strength on each of said plurality of radio channels beginning with said lowest frequency radio channel and continuing in said second order through said highest frequency radio channel.

7. The method of claim 1, wherein said step of sorting further comprises the step of:

sorting said plurality of radio channels into said second order, wherein said second order provides for a minimum total frequency tuning time between said plurality of radio channels.

8. The method of claim 7, wherein said step of sorting further comprises the step of:

determining said second order taking into account frequencies associated with each of said plurality of radio channels.

9. The method of claim 1, wherein said at least one radio device characteristic indicates a time needed to tune between adjacent channels.

10. The method of claim 1, wherein said at least one radio device characteristic indicates that said second order is an order other than increasing or decreasing frequency order.

11. A station comprising:

a radio signal receiving device for receiving radio signals associated with radio channels, each of said radio channels being associated with a different frequency, and for measuring a signal strength associated with each of a plurality of said radio channels; and a control unit for individually tuning said radio signal receiving device to each of said different frequencies corresponding to said plurality of said radio channels, said different frequencies being sorted to reduce a measurement time period during which said signal strengths are measured, wherein said control unit scans said different frequencies in an order which is based, at least in part, on a last frequency to which said radio signal receiving device was tuned.

12. The station of claim 11, wherein said control unit receives a list of said plurality of said radio channels which have already been sorted.

13. The station of claim 11, wherein said control unit sorts said different frequencies in frequency order and tunes said radio signal receiving device to each of said different frequencies beginning with a highest of said different frequencies and descending through said frequencies in order if said last frequency is higher than said highest frequency.

14. The station of claim 11, wherein said control unit sorts said different frequencies in frequency order and tunes said radio signal receiving device to each of said different frequencies beginning with a lowest of said different frequencies and ascending through said frequencies in order if said last frequency is lower than said lowest frequency.

15. The station of claim 11, wherein said control unit further comprises:

means for receiving a list of channel numbers;

means for associating each channel number in said list with its corresponding frequency; and means for sorting said list in frequency order.

16. The station of claim 15, wherein said control unit tunes said radio signal receiving device to each of said different frequencies in said frequency order beginning with one of a lowest of said different frequencies and a highest of said different frequencies depending upon said last frequency.

17. The station of claim 11, wherein said control unit determines said scanning order of said different frequencies based upon at least one characteristic of said radio signal receiving device.

18. The station of claim 17, wherein said radio device characteristic indicates a time needed to tune between adjacent channels.

19. The station of claim 17, wherein said radio device characteristic indicates that said second order is an order other than increasing or decreasing frequency order.

20. The station of claim 11, wherein said station is a base station.

21. The station of claim 11, wherein said station is a mobile station.

22. A method for scanning a list of channel frequencies in a receiver, comprising the steps of:

identifying a last frequency to which said receiver was tuned;

determining an order of said channel frequencies which will reduce scanning time for said list based on said last frequency;

sorting said list according to said determined order; and scanning said sorted list of channel frequencies.

23. The method of claim 22, further comprising the steps of:

retrieving at least one tuning characteristic of said receiver; and said step of determining also determines said order based on said at least one tuning characteristic.

24. The method of claim 22, wherein said step of determining further comprises the steps of:

calculating a first time period that it would take to tune said receiver to each of said channel frequencies if said list is sorted in order from a lowest frequency in said list to a highest frequency in said list;

calculating a second time period that it would take to tune said receiver to each of said channel frequencies if said list is sorted from said highest frequency to said lowest frequency; and selecting, as said order that will reduce scanning time, the order associated with a shortest of said first time period and said second time period.

25. A radiocommunication system comprising:

a fixed portion of said system; and a base station, connected to a fixed portion of said system, for receiving and transmitting signals over an air interface, said base station including:

a radio signal receiving device for receiving radio signals associated with radio channels, each of said radio channels being associated with a different frequency, and for measuring a signal strength associated with each of a plurality of said radio channels; and a control unit for individually tuning said radio signal receiving device to each of said different frequencies corresponding to said plurality of said radio channels, said control unit including means for receiving a sorted list of said radio channels, said radio channels being sorted based on at least one radio device characteristic to reduce a measurement time period during which said signal strengths are measured, wherein said control unit tunes said radio signal receiving device in said sorted order.

26. The system of claim 25, wherein said sorted list is transmitted to said control unit from a processor within said base station.

27. The system of claim 26, wherein said sorted list is transmitted from said fixed portion of said network to said processor.

28. The system of claim 26, wherein said processor includes means for sorting said radio channels based upon a last frequency to which said control unit tuned said radio signal receiving device and said at least one radio device characteristic.

29. The system of claim 27, wherein said fixed portion of said system includes means for sorting said radio channels based upon a last frequency to which said control unit tuned said radio signal receiving device and said at least one radio device characteristic.

30. The system of claim 28, wherein said control unit stores said at least one radio device characteristic and sends said radio device characteristic to said processor.

31. The system of claim 29, wherein said control unit stores said at least one radio device characteristic and sends said radio device characteristic to said fixed portion of said system.

32. The system of claim 25, wherein said control unit includes means for sorting said radio channels based upon a last frequency to which said control unit tuned said radio signal receiving device.

33. The method of claim 1, wherein said at least one radio device characteristic includes a first tuning time between radio channels in a forward direction and a second tuning time between said radio channels in a reverse direction.

34. The station of claim 17, wherein said at least one radio device characteristic includes a first tuning time between radio channels in a forward direction and a second tuning time between said radio channels in a reverse direction.

35. The method of claim 23, wherein said at least one tuning characteristic includes a first tuning time between radio channels in a forward direction and a second tuning time between said radio channels in a reverse direction.

36. The system of claim 25, wherein said at least one radio device characteristic includes a first tuning time between radio channels in a forward direction and a second tuning time between said radio channels in a reverse direction.

* * * * *